United States Patent [19]
Bliamptis

[11] 3,975,676
[45] Aug. 17, 1976

[54] PLURAL ELECTRODE SYSTEM FOR DETERMINING THE ELECTRICAL PARAMETERS OF LARGE SAMPLES OF MATERIALS IN SITU

[75] Inventor: Emmanuel E. Bliamptis, Lexington, Mass.

[73] Assignee: The United States of America as represented by the Secretary of the Air Force, Washington, D.C.

[22] Filed: Mar. 29, 1974

[21] Appl. No.: 456,405

[52] U.S. Cl. ............................ 324/9; 324/10
[51] Int. Cl.² ........................................ G01V 3/06
[58] Field of Search ........................ 324/1, 9, 10

[56] References Cited
UNITED STATES PATENTS

| | | | |
|---|---|---|---|
| 1,842,362 | 1/1932 | Nichols et al. | 324/1 |
| 1,906,271 | 5/1933 | Jakosky | 324/1 |
| 2,172,778 | 9/1939 | Taylor | 324/1 |
| 2,176,758 | 10/1939 | Borden | 324/1 |
| 2,183,565 | 12/1939 | Hawley | 324/1 |
| 2,293,024 | 8/1942 | Klipsch | 324/1 |
| 2,314,597 | 3/1943 | Phelan | 324/1 |
| 2,440,693 | 5/1948 | Lee | 324/1 |
| 2,605,321 | 7/1952 | Owen | 324/1 |
| 3,641,427 | 2/1972 | Pittman et al. | 324/9 |
| 3,838,335 | 9/1974 | Miller | 324/10 |

Primary Examiner—Gerard R. Strecker
Attorney, Agent, or Firm—Joseph E. Rusz; Henry S. Miller

[57] ABSTRACT

A system and method for determining the electrical parameters of large samples of materials in situ. A set of linear electrodes in boreholes forms a square pattern; positive and negative electrical potentials on alternate electrodes create symmetry planes which define several "cells"; a given fraction of electrical current leaves an electrode and reaches a corresponding electrode, an impedance characteristic is determined for each cell. The presence of inhomogeneity and anisotropy is reflected by unequal currents in geometrically equivalent cells.

2 Claims, 4 Drawing Figures

PLURAL ELECTRODE SYSTEM FOR DETERMINING THE ELECTRICAL PARAMETERS OF LARGE SAMPLES OF MATERIALS IN SITU

BACKGROUND OF THE INVENTION

This invention relates generally to the determination of electrical parameters of large samples in situ and more specifically, to the method and means for utilizing the parameters to show the presence of inhomogeniety and anisotropy in large samples.

As an example of one aspect of the invention a "large sample" could be considered a sample of rock and soil in situ. Rock and soil testing under laboratory conditions has been developed to a very satisfactory status. When experimental investigations of large samples in the field are considered, however, varying results occur, the in situ measurements of parameters are not satisfactory and do not match laboratory measurements.

One factor in this discrepancy is the magnitudinous difference in size between samples. In large volumes, many irregularities are encountered, such as cracks, joints voids, weak regions, voids etc. which have a strong influence on the electrical properties of the medium but which are likewise ignored in the testing process for laboratory samples.

Existing methods available for obtaining small signal parameter values for large volumes in situ include geoelectric and seismic measurements. Seismic measurements, coupled with density information, give the average elastic constants of the material. Geoelectric measurements provide information which may be used in a diagnostic sense and under certain circumstances may yield quantities related to the mechanical parameters of the material.

There has thus far been no effective means to provide a direct correlation between the various properties of large volume samples. This invention provides a solution to this problem of the prior art.

SUMMARY OF THE INVENTION

The invention provides a new and improved system and method for determining electrical parameters in large samples and correlating these results to obtain information regarding the material, its consistency and makeup.

The method of the invention utilizes symmetry principles to delineate specific well defined volumes of material on which geophysical measurements are made. This approach allows accurate measurements of geophysical parameters on these large samples without the extra cost and delay of excavation along the symmetry planes.

In the invention symmetry planes are established by means of a plurality of linear electrodes in an equal number of regularly spaced boreholes. The establishment of these symmetry planes (through which electric current does not flow) divides the total sample into several "sample cells". The parameters measured for each such cell can be correlated closely with the material enclosed therein. The correlations are subsequently utilized to provide the information sought.

In an alternative method of operating the array, the array dimensions are kept constant while the array is translated by one array width for each set of measurements.

In rapid surface exploration, a five electrode array may be utilized in the following process. Outer electrodes of the array are moved away from the center of the array in preselected distances and the resulting signals are recorded. Plots of resistivity, dielectric constant, anesotropy and inhomogenity vs distance can then be interpreted in accordance with the known and understood principles of geoelectricity.

It is therefore an object of the invention to provide a new and improved geophysical measurement array.

It is another object of the invention to provide a new and improved geophysical measurement array that determines the electrical parameters of large samples in situ.

It is a further object of the invention to provide a new and improved geophysical measurement array that utilizes electrically established symmetry planes for delineating a definite volume of sample material.

It is still another object of the invention to provide a new and improved geophysical measurement array having the capability of determining both the extent and orientation of inhomogenities contained within the array.

It is still a further object of the invention to provide a new and improved system for measuring large samples in situ.

It is another object of the invention to provide a new and improved system for measuring large samples in situ utilizing a symmetrical arrangement of linear electrodes positioned in boreholds.

It is another object of the invention to provide a new and improved method and system for locating a foreign body in a host matter where the foreign body has electrical properties different from the host matter.

These and other advantages, features and objects of the invention will become more apparent from the following description taken in connection with the illustrative embodiment in the accompanying drawings.

DESCRIPTION OF THE PREFERRED EMBODIMENT

Figure 1:
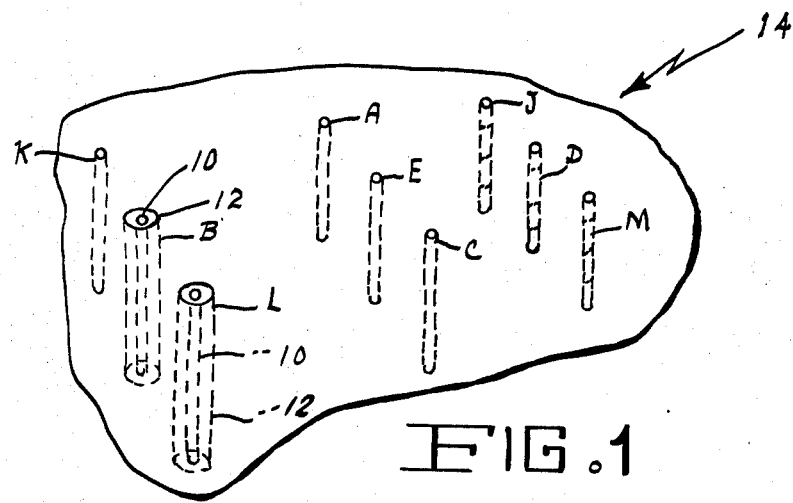
FIG. 1 is a diagrammatic representation of the surface geometry of the geophysical measurement array.

Referring now to FIG. 1 the geophysical measurement array consists of a set of linear electrodes 10 (nine shown for purposes of example) inserted in an equal number of boreholes 12 in the sample generally shown at 14. A typical distance between electrodes is 100 meters. The depth of the boreholes is approximately the same to provide for the equalizing of electrical factors effecting the measured parameters. However, the depth and spacing of electrodes depend upon a particular application and will vary according to a given application.

Figure 2:
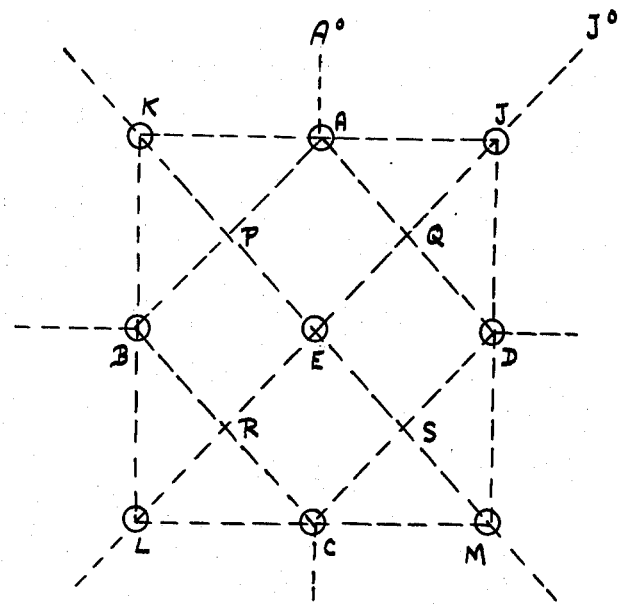
FIG. 2 is a three-dimensional view of the array.

In the schematic top view of the array as shown in FIG. 2, electrodes A, B, C and D are maintained at a positive potential while electrodes J, K, L, M and E are held at a negative potential.

The magnitude of the potential on each set of electrodes is equal although opposite. The applied potentials need not be constant but may be varying in the time domain. In practice, it has been found that the utilization of the array is enhanced with the application of periodically varying voltages of different frequencies.

The particular pattern of the electrodes shown is such that when the sample medium is homogeneous and isotropic, the current flowing from, for example, electrode A to electrode E is confined to the square APEQ.

The fiduciary planes AB, AD, BC, CD, KM and JL are planes of symmetry and they are established by the pattern of applied voltages. As symmetry planes, they are electrical boundaries and the current-to-voltage relationship involves only the characteristic properties of the individual cell defined by those boundaries.

Due to the symmetry of the array, cell APEQ is similar to cells BREP, CSER and DSEQ. The symmetry relations can be extended in both directions by the addition of linear electrodes in boreholes at equal distances and with appropriately alternating potentials.

The validity of the method is shown by the following determination where $+V$ and $-V$ are the applied voltages.

$Y_{1AE}$ is the electrical admittance of the cell APEQ between electrodes A and E. Similarly, $Y_{2AJ}$ is the electrical admittance of region AEJ between electrodes A and J, and $Y_{3AJ}$ is the admittance of the unbounded region $A°AJJ°$ between the electrodes A and J. $I_A$ is the current going into (or coming out of) electrode A. This notation, with obvious modifications, applies to the rest of the array.

Under equilibrium conditions the following equations are true:

$$I_A = 2V(Y_{1AE} + Y_{2AJ} + Y_{2AK} + Y_{3AJ} + Y_{3AK})$$

with similar equations for B, C, D.

$$I_J = 2V(Y_{2AJ} + Y_{2DJ} + Y_{3AJ} + Y_{3DJ})$$

with similar equations for K, L, M.
Finally $$I_E = 2V(Y_{1AE} + Y_{1BE} + Y_{1DE} + Y_{1CE})$$

When the material is homogeneous and isotropic $$Y_{1AE} = Y_{1BE} = Y_{1CE} = Y_{1DE} = Y_1$$

$$Y_{2AJ} = Y_{2AK} = Y_{2BK} = Y_{2BL} = Y_{2CL} = Y_{2CM} = Y_{2DM} = Y_{2DJ} = Y_2$$

$$Y_{3AJ} = Y_{3DJ} = Y_{3BK} = Y_{3AK} = Y_{3BL} = Y_{3CL} = Y_{3CM} = Y_{3DM} = Y_3$$

and the above equations reduce to $$I_A = 2V(Y_1 + 2Y_2 + 2Y_3)$$

$$I_J = 2V(2Y_2 + 2Y_3)$$

$$I_E = 2V(4Y_1)$$

When there is inhomogeneity in the sampled volume, $I_A$, in general, differs from $I_C$ and $I_B$ differs from $I_D$. When there is anisotropy $I_A$, $I_B$, $I_C$ and $I_D$, in general are all different.

Choosing current ratios that are larger than unity one may define the inhomogeneity as $$e_h(AEC) = I_A/I_C - 1$$

$$e_h(BED) = I_B/I_D - 1$$

The anistopy may be defined as $$e_a(AEB) = I_A/I_B - 1$$

$$e_a(CEB) = I_C/I_B - 1$$

$$e_a(AED) = I_A/I_D - 1$$

$$e_a(CED) = I_C/I_D - 1$$

There are two inhomogeneity values and four anistropy values associated with each sample volume treated by a GMA. As defined above all $e_h$ and $e_a$ are positive quantities.

After the anistropy and inhomogeneity at a particular site are determined a simple model satisfying these conditions can be formed. Since the currents $I_A$, $I_B$, $I_C$ and $I_D$ refer only to the particular volume in their own cells it is easy to assign specific features (inclusions) to each cell with respect to size and orientation.

This technique is particularly suitable for mineral exploration wherein the presence of a body of ore (or other material of interest) affects the electrical homogeneity and isotropy of the host medium. Its use is not limited to mineral exploration but encompasses any situation wherein a foreign body is included in host matter with different electrical properties.

Figure 3:
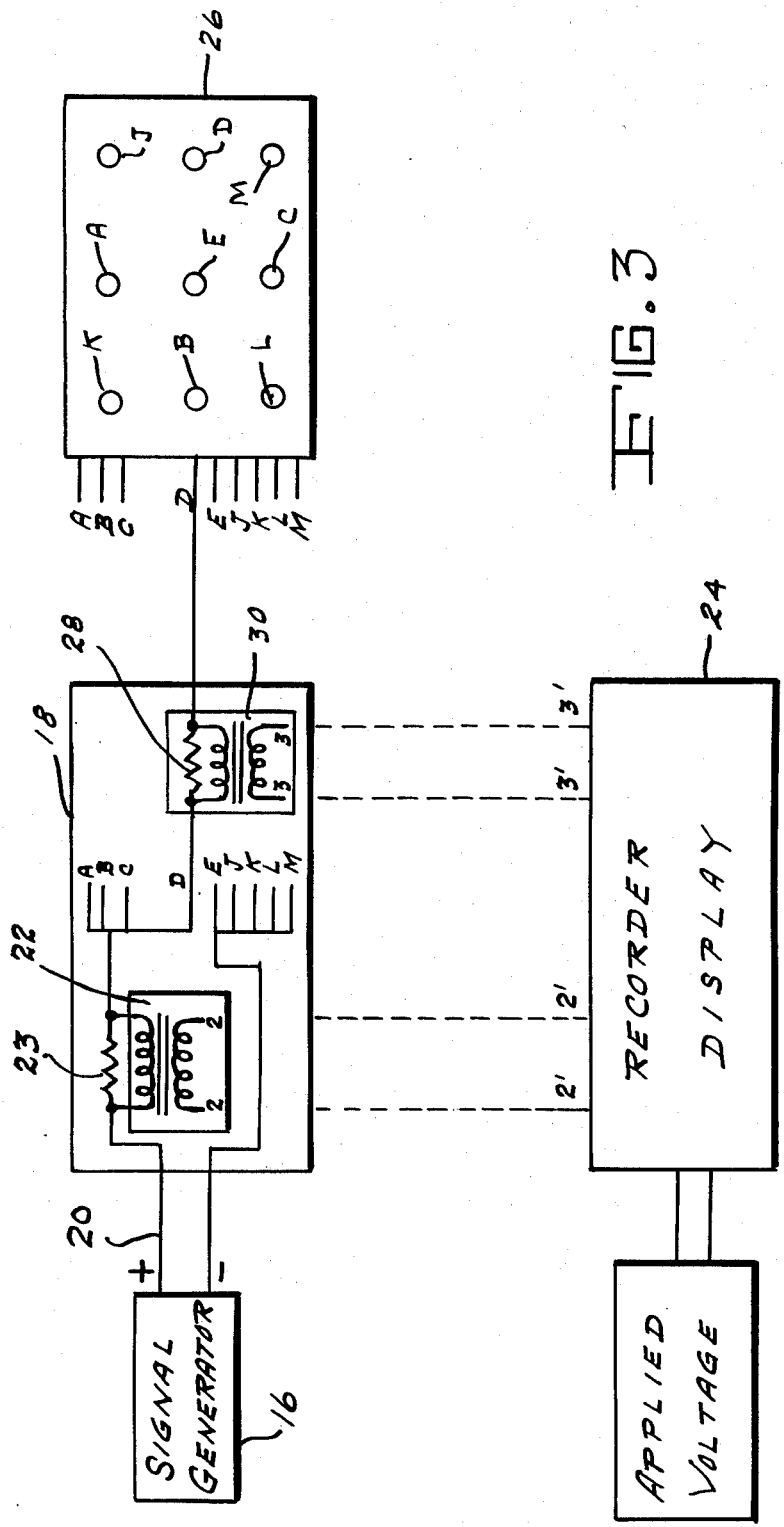
FIG. 3 is an electrical diagram of the measurement system.

FIG. 3 shows a representative electrical system employed to function as part of the invention. A signal generator 16 sends a selected signal to the junction box 18. The positive line of the signal generator 20 includes a resistor 23 which provides a total current calibration signal through a transformer 22 to the recorder 24. The signal is then fed through appropriate connectors A to D and E to M to the array 26 and appropriate bore holes.

At the junction box, in each line is a current sampling resistor 28 which, through the signal transformer 30 produces a signal proportioned to the current $I_D$ as indicated hereinbefore. The current sampling resistors 28 are selected to match the current levels and the recorder sensitivity.

When the array is utilized in the static mode, it is unnecessary to use a tape recorder 24. It is sufficient to use a voltmeter to record signals across the current sampling resistors. In this case, it is likewise unnecessary to utilize the signal transformers.

Figure 4:
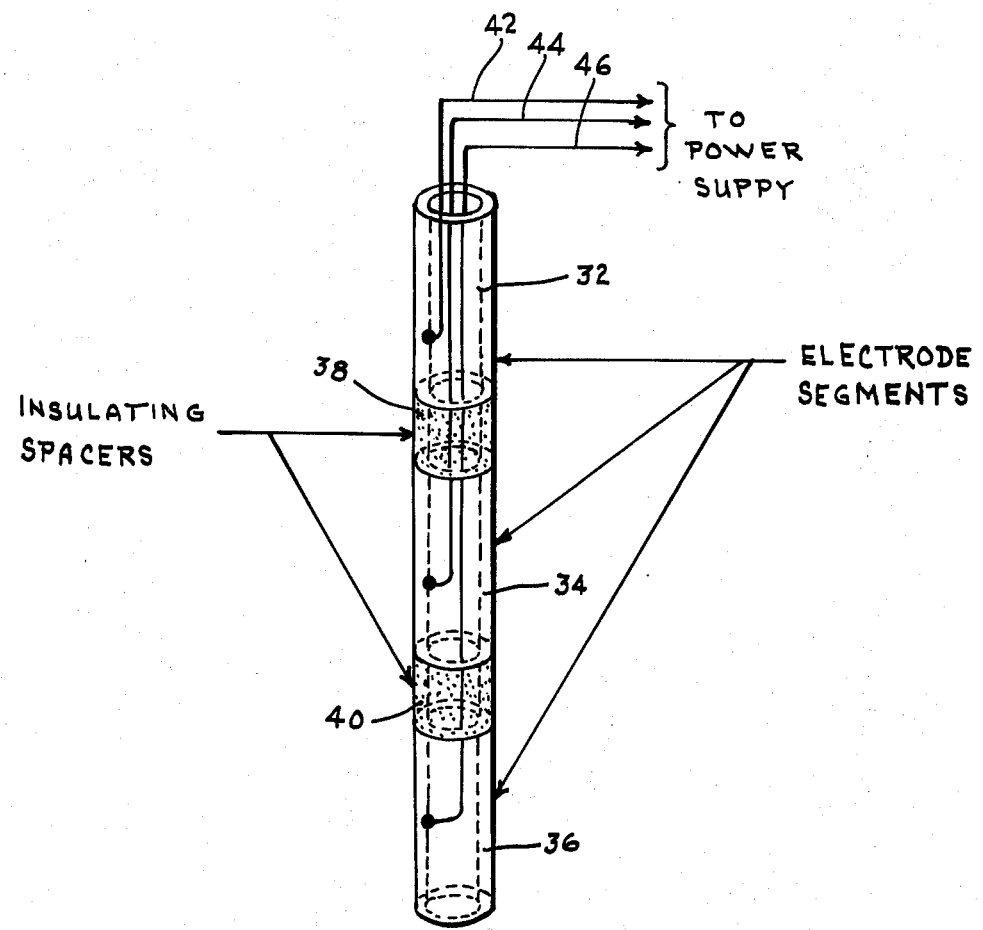
FIG. 4 is a schematic representation of the segmented electrode.

When layering is present in the sample, the electrodes may be subdivided into electrically isolated segments which can be energized separately for each layer, or adjacent electrodes may be connected to form electrode guards to confine the electric fields to the layer of interest. A typical segmented electrode is shown in FIG. 4 having electrically conductive sections 32, 34 and 36, mechanically connected by electrical insulators 38 and 40. Each electrical segment is connected via separate lines (42, 44 and 46) to junction box 18 shown in FIG. 3.

Although the invention has been described with reference to a particular embodiment, it will be understood to those skilled in the art that the invention is capable of a variety of alternative embodiments within the spirit and scope of the appended claims.

I claim:
1. A system for determining irregularities in large geophysical samples comprising: a frequency signal generator; a plurality of linear cylindrically shaped electrodes, adapted to be positioned within the sample and in electrical contact therewith, said electrodes each including a plurality of electrically independent segments, mechanically connected along a common longitudinal axis; a junction box means connecting the frequency signal generator and each said segment of each electrode, wherein a certain designated number of electrodes and segments receive a positive signal from said frequency signal generator and a certain designated number of electrodes and segments receive a negative signal from said frequency signal generator, and periodically varying voltages of different frequencies may be applied to each segment; a recording-display means and sampling resistors positioned in the circuit between said frequency signal generator and said electrodes and connected to the recording-display means whereby changes in current created by sample irregularities will be recorded and displayed.

2. A system for determining irregularities in large samples according to claim 1 wherein said linear electrodes are positioned in a symmetrical array, having a designated central electrode.

* * * * *